United States Patent
Sugino et al.

(10) Patent No.: US 9,140,334 B2
(45) Date of Patent: Sep. 22, 2015

(54) AUTOMATIC TRANSMISSION

(71) Applicant: HONDA MOTOR CO., LTD., Tokyo (JP)

(72) Inventors: Soichi Sugino, Wako (JP); Mariko Shibamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/213,353

(22) Filed: Mar. 14, 2014

(65) Prior Publication Data

US 2014/0287866 A1 Sep. 25, 2014

(30) Foreign Application Priority Data

Mar. 19, 2013 (JP) ................................ 2013-056175

(51) Int. Cl.
*F16H 3/46* (2006.01)
*F16H 3/66* (2006.01)
*F16H 57/08* (2006.01)

(52) U.S. Cl.
CPC .. *F16H 3/46* (2013.01); *F16H 3/66* (2013.01); *F16H 57/08* (2013.01); *F16H 2200/0069* (2013.01); *F16H 2200/2012* (2013.01); *F16H 2200/2048* (2013.01)

(58) Field of Classification Search
None
See application file for complete search history.

(56) References Cited

U.S. PATENT DOCUMENTS

| | | | |
|---|---|---|---|
| 6,068,572 A * | 5/2000 | Collins et al. | 475/331 |
| 6,361,468 B1 | 3/2002 | Kato et al. | |
| 2010/0041509 A1* | 2/2010 | Gumpoltsberger et al. | 475/275 |
| 2010/0081537 A1* | 4/2010 | Sakaue et al. | 475/331 |
| 2011/0111917 A1* | 5/2011 | Heitzenrater et al. | 475/331 |

FOREIGN PATENT DOCUMENTS

JP 2000-304107 A 11/2000

* cited by examiner

*Primary Examiner* — Justin Holmes
*Assistant Examiner* — Timothy M Hannon
(74) *Attorney, Agent, or Firm* — Westerman, Hattori, Daniels & Adrian, LLP

(57) ABSTRACT

In an automatic transmission, a connection member which connects a carrier of a planetary gear mechanism PGSa to a clutch hub of a clutch is made to abut on the carrier of the planetary gear mechanism PGSa in an abutting portion, a thrust bearing T2 is disposed between the connection member and a clutch drum of the clutch, a thrust bearing T1 is disposed between a transmission case and the clutch drum of the clutch, and a clearance between the thrust bearing T1 and the clutch drum of the clutch is adjusted by using a shim. Accordingly, a thrust load inputted from a sun gear Sb of a planetary gear mechanism PGSb can be transmitted to the transmission case without passing through a sun gear Sa, which rotates at a high speed, of the planetary gear mechanism PGSa, and friction loss is reduced.

3 Claims, 15 Drawing Sheets

FIG.5

|  | B1 | B2 | B3 | B4 | C1 | C2 | C3 |
|---|---|---|---|---|---|---|---|
| 1st | ○ | R/F | ○ | | | | |
| 2nd | ○ | R | ○ | | | ○ | |
| 3rd | ○ | R | ○ | | | | ○ |
| 4th | ○ | R | | | | ○ | ○ |
| 5th | ○ | R | | | ○ | | ○ |
| 6th | | R | | | ○ | ○ | ○ |
| 7th | | R | ○ | | ○ | | ○ |
| 8th | | R | ○ | | ○ | ○ | |
| 9th | | R | ○ | ○ | ○ | | |
| 10th | | R | | ○ | ○ | ○ | |
| Rvs | | F | ○ | | | | ○ |

FIG.7

| | DIRECTION OF TORQUE ACTING ON SUN GEAR | | | |
|---|---|---|---|---|
| | PGSd | PGSc | PGSb | PGSa |
| Low | | + | − | + |
| 2nd | | + | − | + |
| 3rd | + | + | − | + |
| 4th | + | + | − | + |
| 5th | | + | − | + |
| 6th | − | + | − | |
| 7th | − | + | − | |
| 8th | | | − | |
| 9th | − | + | − | |
| 10th | − | + | − | |
| Rvs | + | − | + | |

FIG.8

| NAME | T13 | T12 | T11 | T10 | T9 | T8 | T7 | T6 | T5 | T4 | T3 | T2 | T1 |
|---|---|---|---|---|---|---|---|---|---|---|---|---|---|
| | | | | | | BEARING DIFFERENTIAL ROTATION | | | | | | | |
| Low | 1000 | 1000 | | | | 1000 | 620 | | 620 | | | 1000 | 1000 |
| 2nd | 1000 | 478 | 140 | 383 | 383 | 617 | 383 | 104 | 383 | 279 | 279 | 721 | 1000 |
| 3rd | 1000 | | 268 | 732 | 732 | 268 | 166 | 199 | 166 | 533 | 533 | 467 | 1000 |
| 4th | 1000 | | | | | | | 272 | | 728 | 728 | 272 | 1000 |
| 5th | 1000 | | 373 | 1020 | 1020 | 373 | 231 | 373 | 231 | 1000 | 1000 | | 1000 |
| 6th | 1000 | | | | | | | | | | | | 1000 |
| 7th | 1000 | | 268 | 732 | 732 | 268 | 166 | 268 | 166 | 718 | 718 | | 1000 |
| 8th | 1000 | 478 | 140 | 383 | 383 | 617 | 383 | 617 | 383 | 1655 | 1655 | | 1000 |
| 9th | 1000 | 1000 | | | | 1000 | 620 | 1000 | 620 | 2681 | 2681 | | 1000 |
| 10th | 1000 | 1000 | 293 | 801 | 801 | 1293 | 801 | 1293 | 801 | 3467 | 3467 | | 1000 |
| Rvs | 1000 | | 268 | 732 | 732 | 268 | 166 | 732 | 166 | 1963 | 1963 | 1000 | 1000 |

FIG.9

| NAME | T13 | T12 | T11 | T10 | T9 | T8 | T7 | T6 | T5 | T4 | T3 | T2 | T1 |
|---|---|---|---|---|---|---|---|---|---|---|---|---|---|
| | | | | | | BEARING LOAD | | | | | | | |
| Low | 3593 | | | | | 1906 | 1906 | 1690 | | 1690 | | | |
| 2nd | 2742 | 113 | | | | 1055 | 1055 | 1690 | | 1690 | | | |
| 3rd | 2254 | | | | 113 | 1083 | 1196 | 1389 | | 1389 | | | |
| 4th | 1983 | 175 | | | 175 | 1098 | 1274 | 1222 | | 1222 | | | |
| 5th | 1699 | | | | | 902 | 902 | 799 | | 799 | | | |
| 6th | 1163 | | 331 | 331 | | 199 | 199 | | | | | | |
| 7th | 948 | | 153 | 153 | | 503 | 503 | | | | | | |
| 8th | 764 | | | | | 764 | 764 | | | | | | |
| 9th | 630 | | 102 | 102 | | 334 | 334 | | | | | | |
| 10th | 555 | | 158 | 158 | | 95 | 95 | | | | | | |
| Rvs | 634 | 634 | | | 634 | 1846 | 2479 | 4565 | 4565 | | | 4565 | 4565 |

FIG.10

|      | RATIO OF THRUST FORCE | | | |
|------|------|------|------|------|
|      | F1   | F2   | F3   | F4   |
| Low  | 16.9 | 35.9 | 16.9 | 0.0  |
| 2nd  | 16.9 | 27.4 | 16.9 | 0.0  |
| 3rd  | 13.9 | 22.5 | 10.6 | 1.1  |
| 4th  | 12.2 | 19.8 | 7.1  | 1.8  |
| 5th  | 8.0  | 17.0 | 8.0  | 0.0  |
| 6th  | 0.0  | 11.6 | 9.6  | 3.3  |
| 7th  | 0.0  | 9.5  | 4.5  | 1.5  |
| 8th  | 0.0  | 7.6  | 0.0  | 0.0  |
| 9th  | 0.0  | 6.3  | 3.0  | 1.0  |
| 10th | 0.0  | 5.6  | 4.6  | 1.6  |
| Rvs  | 0.0  | 39.3 | 18.5 | 6.3  |

AUTOMATIC TRANSMISSION

BACKGROUND OF THE INVENTION

1. Field of the Invention

The present invention relates to an automatic transmission in which a plurality of planetary gear mechanisms disposed on an axis of an input shaft are housed in a transmission case and a predetermined gear is established by controlling a coupling relationship among elements of the plurality of planetary gear mechanisms, the input shaft, and the transmission case by using a plurality of clutches and a plurality of brakes.

2. Description of the Related Art

Japanese Patent Application Laid-open No. 2000-304107 has made known such an automatic transmission in which differential rotation is absorbed by disposing multiple thrust bearings between multiple rotating members configured to rotate relative to each other about an axis of an input shaft.

SUMMARY OF THE INVENTION

Generally, helical gears with small torque fluctuation are used as gears of the automatic transmission. However, the helical gears have a characteristic that a thrust load in an axial direction is generated by meshing reaction force. Accordingly, in the automatic transmission in which the multiple thrust bearings are disposed between the multiple rotating members configured to rotate relative to each other about the axis of the input shaft, friction of each thrust bearing supporting the thrust load increases and may impair advantages of a multi-speed and wide-range automatic transmission.

The present invention has been made in view of the circumstances described above and an object thereof is to reduce friction loss by transmitting a thrust load generated by gears of an automatic transmission to a transmission case without passing through bearings as much as possible.

In order to achieve the object, according to a first aspect of the present invention, there is provided an automatic transmission in which a plurality of planetary gear mechanisms disposed on an axis of an input shaft are housed in a transmission case and a predetermined gear is established by controlling a coupling relationship among elements of the plurality of planetary gear mechanisms, the input shaft, and the transmission case by using a plurality of clutches and a plurality of brakes, wherein the automatic transmission comprises, as said plurality of planetary gear mechanisms: a planetary gear mechanism A in which elements are rotatable relative to each other; and a planetary gear mechanism B disposed adjacent to the planetary gear mechanism A, in which elements are rotatable relative to each other; the automatic transmission further comprises: as one of said clutches, a clutch is disposed between the planetary gear mechanism B and the transmission case and capable of coupling a carrier of the planetary gear mechanism B to the input shaft; a connection member disposed inside a sun gear of the planetary gear mechanism B in a radial direction and connecting the carrier of the planetary gear mechanism B to a clutch hub of the clutch; an abutting portion in which an end portion of the connection member on the planetary gear mechanism A side abuts on the carrier of the planetary gear mechanism B; a bearing A disposed between the connection member and a clutch drum of the clutch and capable of supporting a thrust load; and a bearing B disposed between the transmission case and the clutch drum of the clutch and capable of supporting the thrust load.

According to the first aspect of the present invention, the automatic transmission includes: the planetary gear mechanism A; the planetary gear mechanism B disposed adjacent to the planetary gear mechanism A; the clutch capable of coupling the carrier of the planetary gear mechanism B to the input shaft; the connection member disposed inside the sun gear of the planetary gear mechanism B in the radial direction and connecting the carrier of the planetary gear mechanism B to the clutch hub of the clutch; and the abutting portion in which the end portion on the planetary gear mechanism A side of the connection member abuts on the carrier of the planetary gear mechanism B. Since the bearing A capable of supporting the thrust load is disposed between the connection member and the clutch drum of the clutch and the bearing B capable of supporting the thrust load is disposed between the transmission case and the clutch drum of the clutch, the thrust load inputted from the planetary gear mechanism A can be transmitted to the transmission case through a route from the abutting portion to the connection member, to the bearing A, to the clutch drum of the clutch, and to the bearing B. The thrust load is transmitted not through the sun gear, which rotates at a high speed, of the planetary gear mechanism B but through only the bearing A and the bearing B. Accordingly, friction loss is reduced.

According to a second aspect of the present invention, in addition to the first aspect, a shim configured to adjust variations in dimensions of parts disposed on the input shaft is disposed in an end portion on the transmission case side of the clutch drum of the clutch.

According to the second aspect of the present invention, since the shim is disposed in the end portion of the clutch drum on the transmission case side of the clutch, variations in dimensions of the parts disposed on the input shaft can be adjusted. In this case, since the number of bearings to which the thrust load is transmitted is reduced, accumulation amount of dimension tolerances is reduced and the number of types of thickness of the shim can be reduced.

According to a third aspect of the present invention, in addition to the first or second aspect, there is provided the automatic transmission further comprising: a bearing C disposed between the sun gear and the carrier of the planetary gear mechanism B and capable of supporting the thrust load; and a bearing D disposed between the clutch hub of the clutch and the sun gear of the planetary gear mechanism B and capable of supporting the thrust load, wherein a distance from a load transmission surface, where the thrust load is transmitted from the carrier of the planetary gear mechanism B to the bearing C, to a load receiving surface, where the clutch hub of the clutch receives the thrust load from the bearing D, is set to be greater than a sum of axial lengths of the bearing C, the sun gear of the planetary gear mechanism B, and the bearing D.

According to the third aspect of the present invention, the automatic transmission includes: the bearing C disposed between the sun gear and the carrier of the planetary gear mechanism B and capable of supporting the thrust load; and the bearing D disposed between the clutch hub of the clutch and the sun gear of the planetary gear mechanism B and capable of supporting the thrust load, and the distance from the load transmission surface, where the thrust load is transmitted from the carrier of the planetary gear mechanism B to the bearing C, to the load receiving surface, where the clutch hub of the clutch receives the thrust load from the bearing D, is set to be greater than the sum of the axial lengths of the bearing C, the sun gear of the planetary gear mechanism B, and the bearing D. Accordingly, it is possible to avoid a situation where the load inputted from the planetary gear mechanism A is transmitted to the transmission case through the bearing C and the bearing D, and to surely reduce friction.

Note that a first planetary gear mechanism PGSa of an embodiment corresponds to the planetary gear mechanism B of the present invention, a second planetary gear mechanism PGSb of the embodiment corresponds to the planetary gear mechanism A of the present invention, a first clutch C1 of the embodiment corresponds to the clutch of the present invention, a first thrust bearing T1 of the embodiment corresponds to the bearing B of the present invention which is capable of supporting the thrust load, a second thrust bearing T2 of the embodiment corresponds to the bearing A of the present invention which is capable of supporting the thrust load, a third thrust bearing T3 of the embodiment corresponds to the bearing D of the present invention which is capable of supporting the thrust load, and a fourth thrust bearing T4 of the embodiment corresponds to the bearing C of the present invention which is capable of supporting the thrust load.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 5 is an engagement table of clutches and brakes.
FIG. 7 is a table showing directions of torques of sun gears of the first to fourth planetary gear mechanisms in each of gears.
FIG. 8 is a table showing magnitudes of differential rotations of first to thirteenth thrust bearings in each of the gears.
FIG. 9 is a table showing magnitudes of thrust loads of the first to thirteenth thrust bearings in each of the gears.
FIG. 10 is a table showing ratios of the thrust loads of the first to fourth planetary gear mechanism in each of the gears.

DESCRIPTION OF THE PREFERRED EMBODIMENT

An embodiment of the present invention is described below based on FIGS. 1 to 15.

Figure 1:
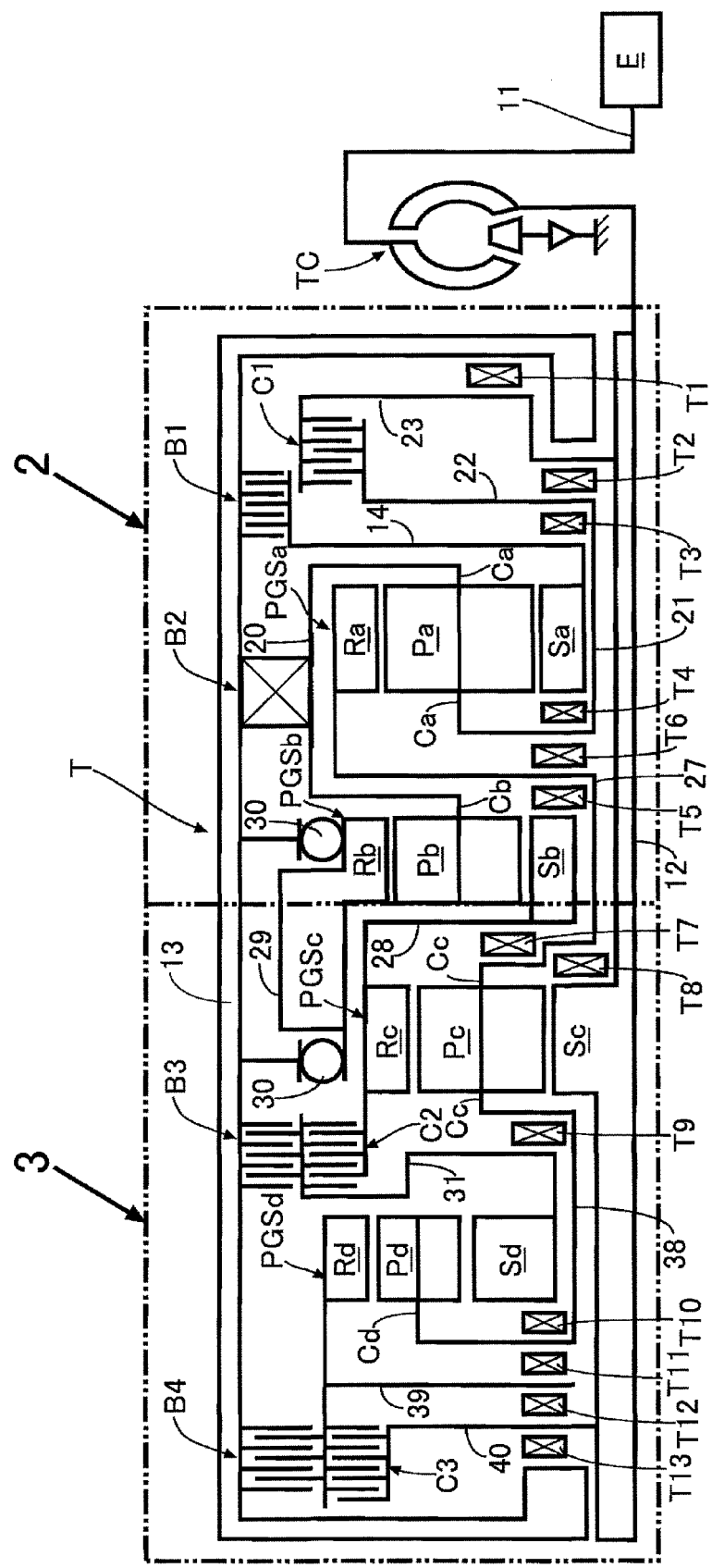
FIG. 1 is a skeleton view of an automatic transmission.
Figure 2:
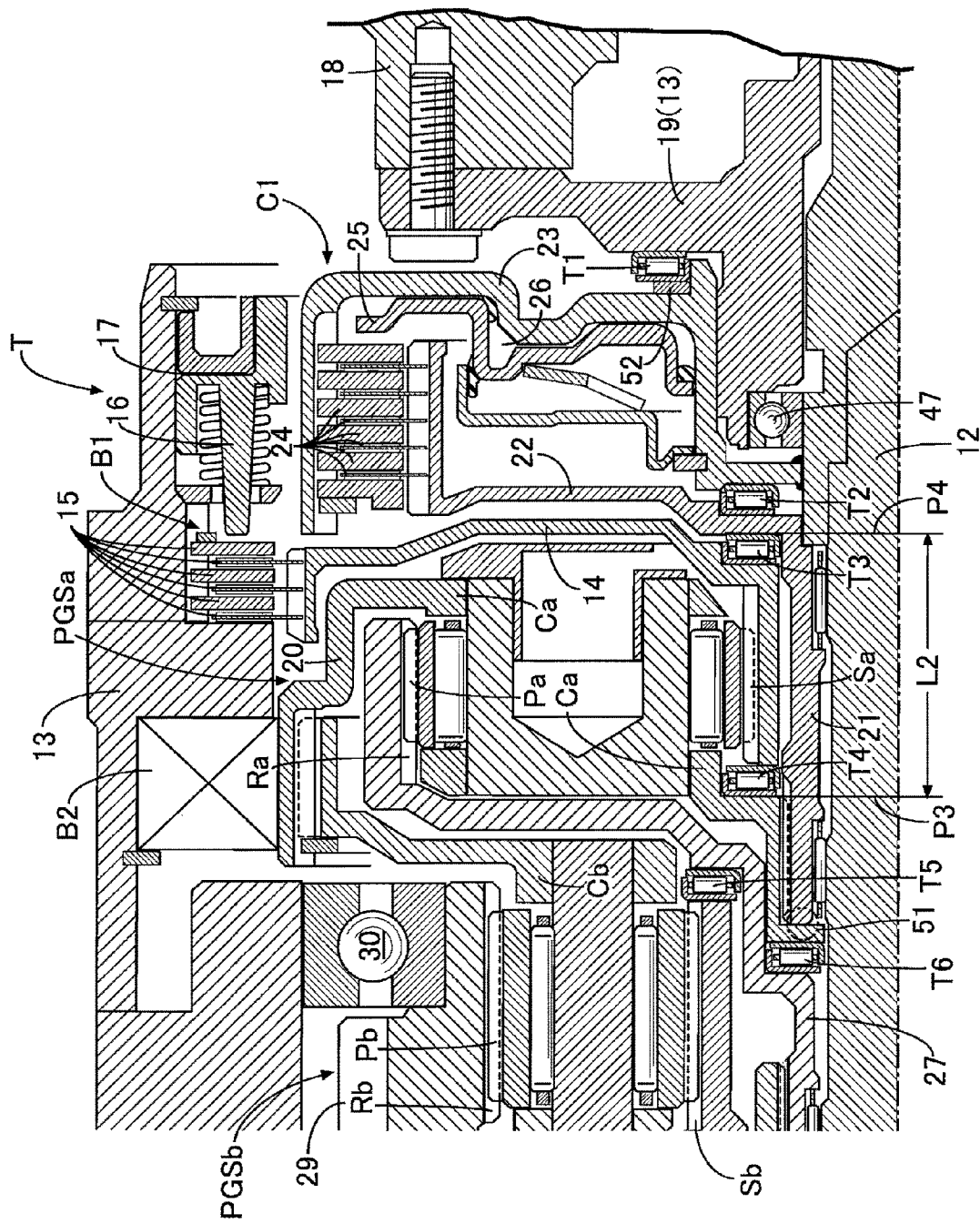
FIG. 2 is a detailed view of a portion 2 in FIG. 1.
Figure 3:
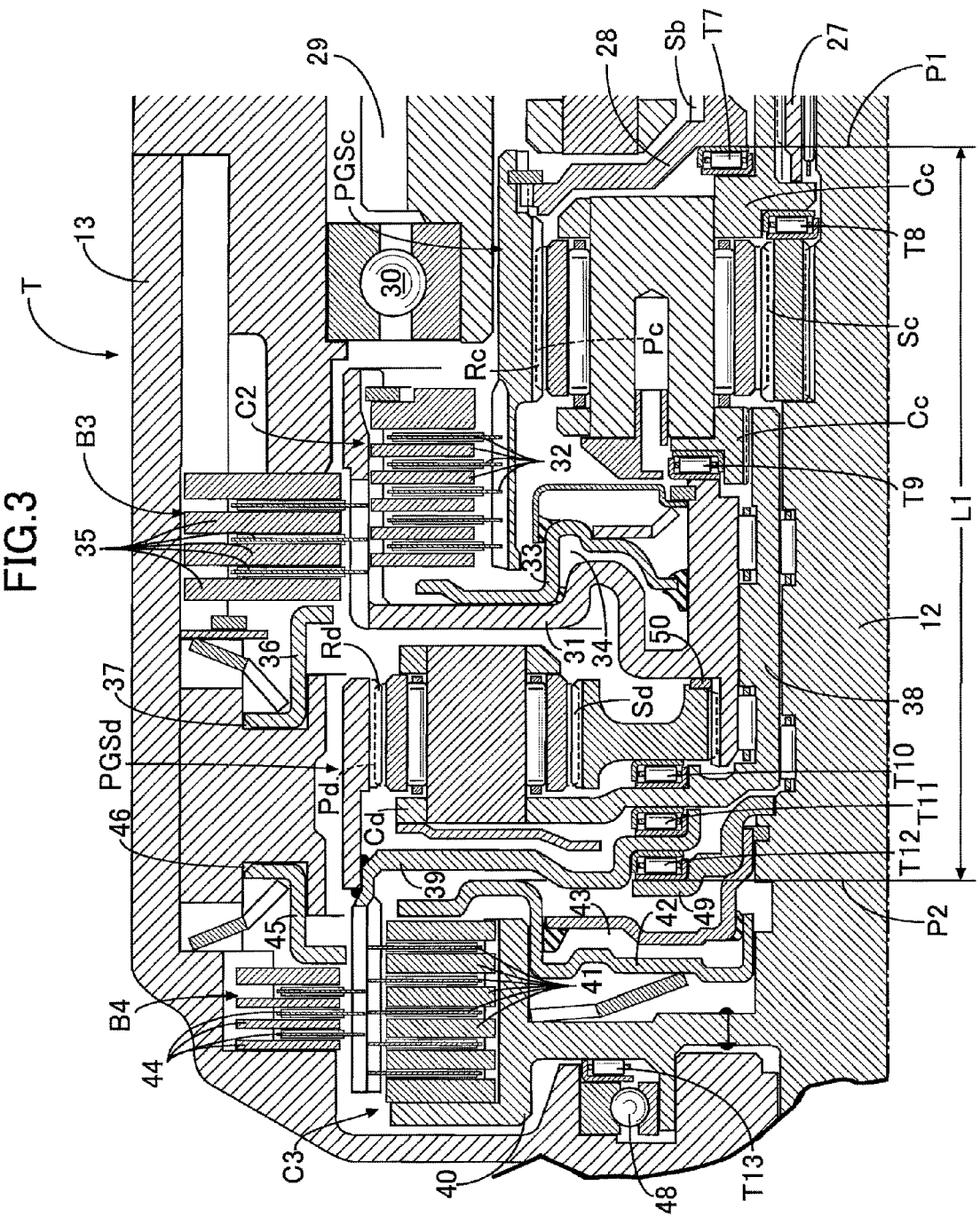
FIG. 3 is a detailed view of a portion 3 in FIG. 1.

First, a structure of an automatic transmission T with ten forward gears and one reverse gear is described based on a skeleton view of FIG. 1 and detailed views of FIGS. 2 and 3.

A crankshaft 11 of an engine E is connected to an input shaft 12 of the automatic transmission T via a torque converter TC. A first planetary gear mechanism PGSa, a second planetary gear mechanism PGSb, a third planetary gear mechanism PGSc, and a fourth planetary gear mechanism PGSd are arranged on an outer periphery of the input shaft 12 in this order from a side closer to the engine E (right side in the drawing) to a side farther from the engine E (left side in the drawing). Moreover, a first clutch C1, a second clutch C2, a third clutch C3, a first brake B1, a second brake B2, a third brake B3, and a fourth brake B4 are provided to establish each of gears by switching coupling relationships among elements of the first to fourth planetary gear mechanisms PGSa, PGSb, PGSc, PGSd. The second brake B2 is formed of a two-way clutch and a direction of relative rotation in which the two-way clutch is engaged can be arbitrarily changed. The other clutches and brakes are formed of wet multi-plate clutches and brakes.

The single-pinion first planetary gear mechanism PGSa includes a first sun gear Sa, a first carrier Ca, a first ring gear Ra, and multiple first pinions Pa. The first pinions Pa rotatably supported by the first carrier Ca simultaneously mesh with the first sun gear Sa and the first ring gear Ra.

The first sun gear Sa can be coupled to a transmission case 13 via the first brake B1. Specifically, the first brake B1 includes a brake hub 14 integral with the first sun gear Sa, multiple friction engagement elements 15 disposed between the brake hub 14 and the transmission case 13, and a brake piston 16 disposed in the transmission case 13 to be slidable in an axial direction. When the brake piston 16 is driven by hydraulic pressure supplied to an oil chamber 17 and the friction engagement elements 15 are thereby engaged with each other, the first sun gear Sa is coupled to the transmission case 13.

Although the transmission case 13 is actually formed of multiple members, the transmission case 13 is illustrated as one member in the drawings for the sake of convenience. Moreover, in the specification, a stator shaft 19 fixed to a torque converter case 18 is also part of the transmission case 13.

A connection member 20 extending outward in a radial direction from the first carrier Ca can be coupled to the transmission case 13 via the second brake B2. Moreover, the first carrier Ca can be coupled to the input shaft 12 via the first clutch C1. Specifically, the first clutch C1 includes a clutch hub 22 connected to an inner end of the first carrier Ca in the radial direction via a connection member 21, a clutch drum 23 fixed to the input shaft 12, multiple friction engagement elements 24 disposed between the clutch hub 22 and the clutch drum 23, and a clutch piston 25 slidably disposed inside the clutch drum 23. When the clutch piston 25 is driven by hydraulic pressure supplied to an oil chamber 26 and the friction engagement elements 24 are thereby engaged with each other, the first carrier Ca is coupled to the input shaft 12.

The first ring gear Ra is connected to a third carrier Cc of the third planetary gear mechanism PGSc to be described later, via a connection member 27.

The single-pinion second planetary gear mechanism PGSb includes a second sun gear Sb, a second carrier Cb, a second ring gear Rb, and multiple second pinions Pb. The second pinions Pb rotatably supported by the second carrier Cb simultaneously mesh with the second sun gear Sb and the second ring gear Rb.

The second sun gear Sb is connected to a third ring gear Rc of the third planetary gear mechanism PGSc to be described later via a connection member 28. The second carrier Cb is integrally connected to the first carrier Ca of the first planetary gear mechanism PGSa via the connection member 20 and can be coupled to the transmission case 13 via the second brake B2. An output gear 29 is formed integrally with the second ring gear Rb and is rotatably supported by the transmission case 13 via a pair of ball bearings 30.

The single-pinion third planetary gear mechanism PGSc includes a third sun gear Sc, the third carrier Cc, the third ring gear Rc, and multiple third pinions Pc. The third pinions Pc rotatably supported by the third carrier Cc simultaneously mesh with the third sun gear Sc and the third ring gear Rc.

The third sun gear Sc is integrally coupled to the input shaft 12. The third carrier Cc is connected to the first ring gear Ra of the first planetary gear mechanism PGSa via the connection member 27. The third ring gear Rc can be coupled to a clutch drum 31 connected to a fourth sun gear Sd of the fourth planetary gear mechanism PGSd to be described later, via the second clutch C2. Specifically, the second clutch C2 includes multiple friction engagement elements 32 disposed between the third ring gear Rc and the clutch drum 31 and a clutch piston 33 slidably disposed inside the clutch drum 31. When the clutch piston 33 is driven by hydraulic pressure supplied to an oil chamber 34 and the friction engagement elements 32 are thereby engaged with each other, the third ring gear Rc of the third planetary gear mechanism PGSc is coupled to the fourth sun gear Sd of the fourth planetary gear mechanism PGSd.

The single-pinion fourth planetary gear mechanism PGSd includes the fourth sun gear Sd, a fourth carrier Cd, a fourth ring gear Rd, and multiple fourth pinions Pd. The fourth pinions Pd rotatably supported by the fourth carrier Cd simultaneously mesh with the fourth sun gear Sd and the fourth ring gear Rd.

The clutch drum 31 connected to the fourth sun gear Sd can be coupled to the transmission case 13 via the third brake B3. Specifically, the third brake B3 includes multiple friction engagement elements 35 disposed between the clutch drum 31 and the transmission case 13 and a brake piston 36 slidably disposed inside the transmission case 13. When the brake piston 36 is driven by hydraulic pressure supplied to an oil chamber 37 and the friction engagement elements 35 are thereby engaged with each other, the fourth sun gear Sd is coupled to the transmission case 13.

The fourth carrier Cd is connected to the third carrier Cc of the third planetary gear mechanism PGSc via a connection member 38. The fourth ring gear Rd can be coupled to the input shaft 12 via the third clutch C3. Specifically, the third clutch C3 includes a clutch drum 39 integrally connected to the fourth ring gear Rd, a clutch hub 40 integrally connected to the input shaft 12, multiple friction engagement elements 41 disposed between the clutch drum 39 and the clutch hub 40, and a clutch piston 42 slidably disposed inside the clutch drum 39. When the clutch piston 42 is driven by hydraulic pressure supplied to an oil chamber 43 and the friction engagement elements 41 are thereby engaged with each other, the fourth ring gear Rd is coupled to the input shaft 12.

Furthermore, the fourth ring gear Rd can be coupled to the transmission case 13 via the fourth brake B4. Specifically, the fourth brake B4 includes multiple friction engagement elements 44 disposed between the clutch drum 39 and the transmission case 13 and a brake piston 45 slidably disposed inside the transmission case 13. When the brake piston 45 is driven by hydraulic pressure supplied to an oil chamber 46 and the friction engagement elements 44 are thereby engaged with each other, the fourth ring gear Rd is coupled to the transmission case 13.

A shaft end on the engine E side of the input shaft 12 is directly supported by the stator shaft 19 forming part of the transmission case 13, via a ball bearing 47. Meanwhile, a shaft end on the opposite side to the engine E of the input shaft 12 is supported in such a way that the clutch hub 40 fixed to the shaft end on the opposite side is supported by the transmission case 13 via a ball bearing 48.

The gears of the first planetary gear mechanism PGSa, the second planetary gear mechanism PGSb, the third planetary gear mechanism PGSc, and the fourth planetary gear mechanism PGSd are formed of helical gears to reduce fluctuations of transmission torques. However, since thrust force in the axial direction acts on each of the helical gears due to meshing reaction force, 13 thrust bearings are disposed between the members rotating relative to one another.

A first thrust bearing T1 is disposed between the clutch drum 23 of the first clutch C1 and the stator shaft 19 forming part of the transmission case 13. A second thrust bearing T2 is disposed between the clutch drum 23 and the clutch hub 22 of the first clutch C1. A third thrust bearing T3 is disposed between the clutch hub 22 and the first sun gear Sa of the first planetary gear mechanism PGSa. A fourth thrust bearing T4 is disposed between the first sun gear Sa and the first carrier Ca of the first planetary gear mechanism PGSa. A fifth thrust bearing T5 is disposed between the connection member 27 connected to the first ring gear Ra of the first planetary gear mechanism PGSa and the second sun gear Sb of the second planetary gear mechanism PGSb. A sixth thrust bearing T6 is disposed between the connection member 27 and the first carrier Ca of the first planetary gear mechanism PGSa.

A seventh thrust bearing T7 is disposed between the second sun gear Sb of the second planetary gear mechanism PGSb and the third carrier Cc of the third planetary gear mechanism PGSc. An eighth thrust bearing T8 is disposed between the third carrier Cc and the third sun gear Sc of the third planetary gear mechanism PGSc. A ninth thrust bearing T9 is disposed between the third carrier Cc and the clutch drum 31 of the second clutch C2. A tenth thrust bearing T10 is disposed between the fourth sun gear Sd and the fourth carrier Cd of the fourth planetary gear mechanism PGSd. An eleventh thrust bearing T11 is disposed between the fourth carrier Cd and the clutch drum 39 of the third clutch C3. A twelfth thrust bearing T12 is disposed between the clutch drum 39 and a thrust plate 49 fixed to the input shaft 12. A thirteenth thrust bearing T13 is disposed between the clutch hub 40 of the third clutch C3 and the transmission case 13.

A shim 50 (see FIG. 3) is disposed between the fourth sun gear Sd of the fourth planetary gear mechanism PGSd and the clutch drum 31 of the second clutch C2. The first carrier Ca of the first planetary gear mechanism PGSa and the connection member 21 extending leftward in the drawing from the clutch hub 22 of the first clutch C1 abut on each other in an abutting portion 51 (see FIG. 2). A shim 52 (see FIG. 2) for adjusting dimensional errors of respective parts stacked on the input shaft 12 is disposed between the first thrust bearing T1 and the clutch drum 23 of the first clutch C1.

A distance L1 from a load transmission surface P1, where thrust load is transmitted from the second sun gear Sb of the second planetary gear mechanism PGSb to the seventh thrust bearing T7, to a load receiving surface P2, where the thrust plate 49 receives the thrust load from the twelfth thrust bearing T12, is set to be greater than a sum of axial lengths of multiple parts disposed between the load transmission surface P1 and the load receiving surface P2, i.e. the seventh thrust bearing T7, the third carrier Cc of the third planetary gear mechanism PGSc, the ninth thrust bearing T9, the clutch drum 31 of the second clutch C2, the shim 50, the fourth sun gear Sd of the fourth planetary gear mechanism PGSd, the tenth thrust bearing T10, the fourth carrier Cd of the fourth planetary gear mechanism PGSd, the eleventh thrust bearing T11, the clutch drum 39 of the third clutch C3, and the twelfth thrust bearing T12 (see FIG. 3).

Figure 6:
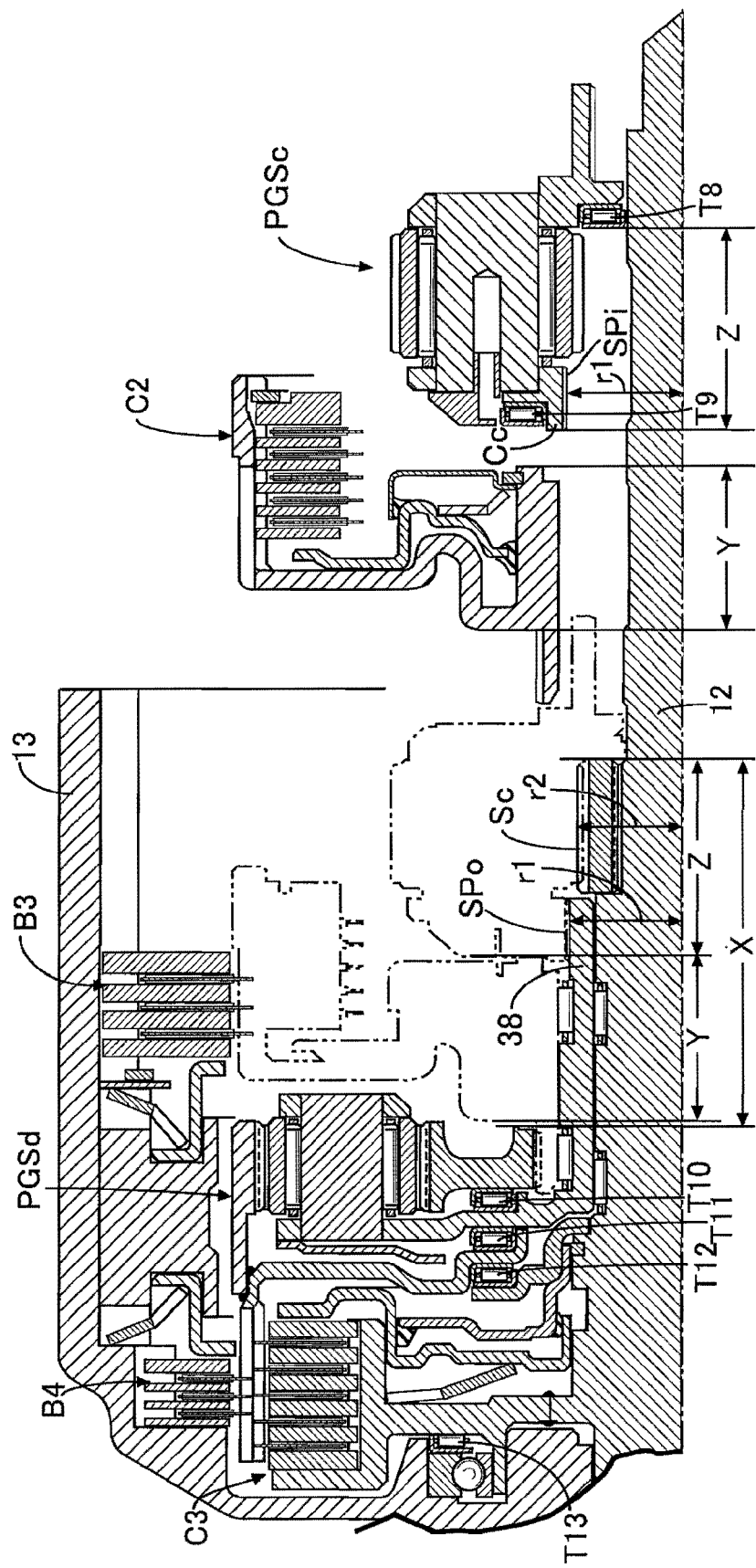
FIG. 6 is an operation explanatory view in assembly of the automatic transmission.

An outer periphery spline SPo formed on an outer peripheral surface of a right end, in the drawing, of the connection member 38 connected to the fourth carrier Cd of the fourth planetary gear mechanism PGSd and an inner periphery spline SPi formed on an inner peripheral surface of a left end, in the drawing, of the third carrier Cc of the third planetary gear mechanism PGSc mesh with each other (see FIG. 6). An inner radius r1 of the inner periphery spline SPi of the third carrier Cc is set to be greater than an outer radius r2 of the third sun gear Sc of the third planetary gear mechanism PGSc.

A distance L2 from a load transmission surface P3, where the thrust load is transmitted from the first carrier Ca of the first planetary gear mechanism PGSa to the fourth thrust bearing T4, to a load receiving surface P4, where the clutch hub 22 of the first clutch C1 receives the thrust load from the third thrust bearing T3, is set to be greater than a sum of axial lengths of the fourth thrust bearing T4, the first sun gear Sa of the first planetary gear mechanism PGSa, and the third thrust bearing T3 (see FIG. 2).

Figure 4:
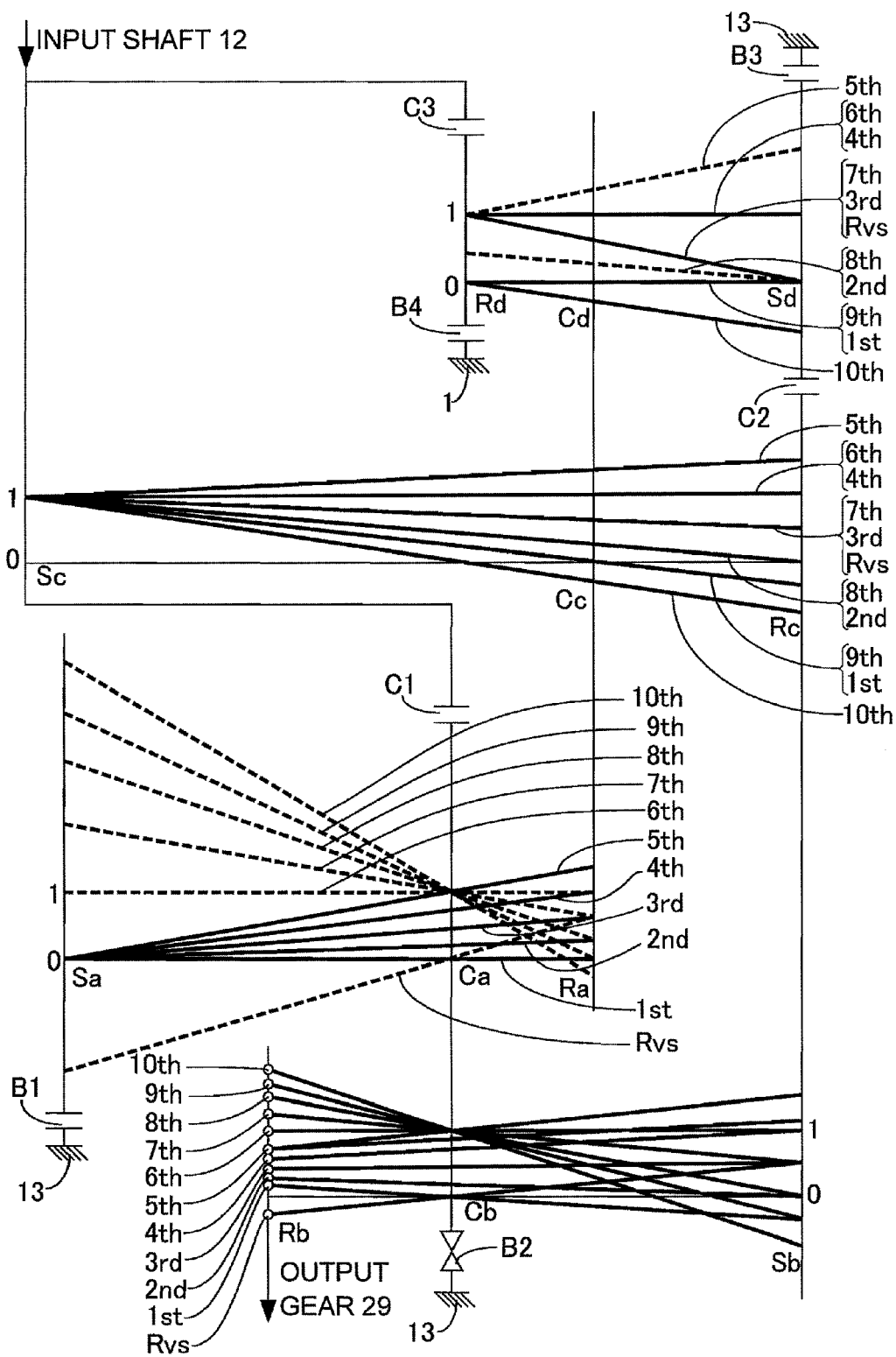
FIG. 4 is a collinear chart of first to fourth planetary gear mechanisms.

FIG. 4 is a collinear chart of the first to fourth planetary gear mechanisms PGSa, PGSb, PGSc, PGSd and four parts in the collinear chart shows respectively the fourth planetary gear mechanism PGSd, the third planetary gear mechanism PGSc, the first planetary gear mechanism PGSa, and the second planetary gear mechanism PGSb in this order from the top to the bottom.

For example, a gear ratio of the first planetary gear mechanism PGSa shown in the third part from the top is h and a ratio of the distance between the first sun gear Sa and the first carrier Ca to the distance between the first carrier Ca and the first ring gear Ra is set to h:1. Similarly, a gear ratio of the second planetary gear mechanism PGSb is i, a gear ratio of the third planetary gear mechanism PGSc is j, and a gear ratio of the fourth planetary gear mechanism PGSd is k.

A horizontal line on the upper side out of two parallel horizontal lines in each of the four parts in the collinear chart means that a rotation speed is "1" (the same rotation speed as the input shaft 12) while a horizontal line on the lower side out of the two horizontal lines means that the rotation speed is "0" (stopped). Moreover, each of speed lines drawn by broken lines indicates that a corresponding one of the first to fourth planetary gear mechanisms PGSa, PGSb, PGSc, PGSd idles while following another planetary gear mechanism which transmits power.

FIG. 7 shows a direction of torque acting on each of the first to fourth sun gears Sa, Sb, Sc, Sd of the first planetary gear mechanism PGSa, the second planetary gear mechanism PGSb, the third planetary gear mechanism PGSc, and the fourth planetary gear mechanism PGSd. Symbol "+" indicates that the direction of the torque is the same as a direction of torque of the engine E while symbol "−" indicates that the direction of the torque is opposite to that of the torque of the engine E. A direction of a thrust load acting on each of the first to fourth sun gears Sa, Sb, Sc, Sd which are formed of helical gears is determined depending on the direction of the torque.

A thrust load acting leftward in the drawing acts on the first sun gear Sa of the first planetary gear mechanism PGSa in a first gear to a fifth gear while no thrust load acts thereon in the other gears. A thrust load acting leftward in the drawing acts on the second sun gear Sb of the second planetary gear mechanism PGSb in all of the forward gears while a thrust load acting rightward in the drawing acts thereon in the reverse gear. A thrust load acting leftward in the drawing acts on the third sun gear Sc of the third planetary gear mechanism PGSc in all forward gears except for an eighth gear while a thrust load acting rightward in the drawing acts thereon in the reverse gear. A thrust load acting leftward in the drawing acts on the fourth sun gear Sd of the fourth planetary gear mechanism PGSd in a sixth gear, a seventh gear, a ninth gear, and a tenth gear while a thrust load acting rightward in the drawing acts thereon in a third gear, a fourth gear, and the reverse gear.

FIG. 8 shows an example of differential rotation of the first to thirteenth thrust bearings T1 to T13 in each gear and 1,000 rpm corresponds to differential rotation between the input shaft 12 and the transmission case 13. For example, differential rotation between the first thrust bearing T1 and the thirteenth thrust bearing T13 which are disposed between the input shaft 12 and the transmission case 13 is 1,000 rpm.

FIG. 9 shows an example of thrust loads acting on the first to thirteenth thrust bearings T1 to T13 in each gear. Since the thrust loads acting on the first to thirteenth thrust bearings T1 to T13 vary depending on torsion angles of gears, FIG. 9 shows an example of the thrust loads.

Since the sun gear and the ring gear of each single-pinion planetary gear mechanism mesh with common pinions, thrust loads received by the sun gear and the ring gear are loads of the same magnitude in directions opposite to each other. FIG. 10 shows thrust loads F1 of the first sun gear Sa and the first ring gear Ra of the first planetary gear mechanism PGSa, thrust loads F2 of the second sun gear Sb and the second ring gear Rb of the second planetary gear mechanism PGSb, thrust loads F3 of the third sun gear Sc and the third ring gear Rc of the third planetary gear mechanism PGSc, and thrust loads F4 of the fourth sun gear Sd and the fourth ring gear Rd of the fourth planetary gear mechanism PGSd, in each gear. Note that numeric values of F1 to F4 in FIG. 10 show magnitudes of the loads relative to each other.

Next, description is given of the embodiment of the present invention including the configuration described above.

First, a torque flow in each gear is described based on the skeleton view of FIG. 1, the collinear chart of FIG. 4, and the engagement table of FIG. 5. Circle signs in the engagement table of FIG. 5 each indicate that the corresponding clutch or brake is in an engaged state. Moreover, since the second brake B2 is formed of the two-way clutch, the second brake B2 can be switched between a forward rotation preventing state F and a reverse rotation preventing state R. The underlined F and R indicate that the rotation speeds of the first carrier Ca and the second carrier Cb become "0" due to an operation of the second brake B2.

When the first gear is established, the first brake B1 is engaged, the second brake B2 is set to the reverse rotation preventing state, and the third brake B3 is engaged. Setting the second brake B2 to the reverse rotation preventing state prevents reverse rotation of the first carrier Ca and the second carrier Cb. Engaging the first brake B1 causes the rotation speed of the first sun gear Sa to become "0". The three elements of the first planetary gear mechanism PGSa are thus set to a locked state in which the elements cannot rotate relative to each other, and the rotation speeds of the first ring gear Ra, the third carrier Cc, and the fourth carrier Cd also become "0". As a result, the rotation speed of the second ring gear Rb to which the output gear 29 is connected becomes "1st" shown in FIG. 4 and the first gear is established.

Although there is no need to engage the third brake B3 to establish the first gear, shifting from the first gear to the second gear can be smoothly performed by engaging the third brake B3 in advance while the first gear is established. Moreover, in a case where activation of engine brake is required in the first gear, the second brake B2 can be switched from the reverse rotation preventing state to the forward rotation preventing state.

When the second gear is established, the first brake B1 is engaged, the second brake B2 is set to the reverse rotation preventing state, the third brake B3 is engaged, and the second clutch C2 is engaged. Setting the second brake B2 to the reverse rotation preventing state allows the forward rotation of the first carrier Ca and the second carrier Cb. Engaging the first brake B1 causes the rotation speed of the first sun gear Sa to become "0". Engaging the third brake B3 causes the rotation speed of the fourth sun gear Sd to become "0". Engaging the second clutch C2 causes the rotation speeds of the third ring gear Rc and the second sun gear Sb to become "0" which is the same speed as the rotation speed of the fourth sun gear Sd. As a result, the rotation speed of the second ring gear Rb to which the output gear 29 is connected becomes "2nd" shown in FIG. 4 and the second gear is established.

When the third gear is established, the first brake B1 is engaged, the second brake B2 is set to the reverse rotation preventing state, the third brake B3 is engaged, and the third clutch C3 is engaged. Setting the second brake B2 to the reverse rotation preventing state allows the forward rotation of the first carrier Ca and the second carrier Cb. Engaging the first brake B1 causes the rotation speed of the first sun gear Sa to become "0". Engaging the third brake B3 causes the rotation speed of the fourth sun gear Sd to become "0". Engaging the third clutch C3 causes the rotation speed of the fourth ring gear Rd to become "1" which is the same speed as the rotation speed of the third sun gear Sc connected to the input shaft 12. Since the rotation speed of the fourth sun gear Sd becomes "0" and the rotation speed of the fourth ring gear Rd becomes "1" as described above, the rotation speed of the fourth carrier Cd, i.e. the rotation speeds of the fourth carrier Cd, the third carrier Cc, and the first ring gear Ra, becomes $k/(k+1)$. As a result, the rotation speed of the second ring gear Rb to which the output gear 29 is connected becomes "3rd" shown in FIG. 4 and the third gear is established.

When the fourth gear is established, the first brake B1 is engaged, the second brake B2 is set to the reverse rotation preventing state, the second clutch C2 is engaged, and the third clutch C3 is engaged. Setting the second brake B2 to the reverse rotation preventing state allows the forward rotation of the first carrier Ca and the second carrier Cb. Engaging the first brake B1 causes the rotation speed of the first sun gear Sa to become "0". Engaging the second clutch C2 causes the fourth sun gear Sd, the third ring gear Rc, and the second sun gear Sb to rotate at the same speed. This causes the third carrier Cc and the fourth carrier Cd to be coupled to each other and the third ring gear Rc and the fourth sun gear Sd to be coupled to each other between the third planetary gear mechanism PGSc and the fourth planetary gear mechanism PGSd. Hence, in the fourth gear in which the second clutch C2 is engaged, one collinear chart including the four elements can be drawn with the third planetary gear mechanism PGSc and the fourth planetary gear mechanism PGSd.

Moreover, engaging the third clutch C3 causes the rotation speed of the fourth ring gear Rd to become "1" which is the same speed as the rotation speed of the third sun gear Sc and the rotation speeds of two elements out of the four elements included in the third planetary gear mechanism PGSc and the fourth planetary gear mechanism PGSd become the same speed of "1". As a result, the elements of the third planetary gear mechanism PGSc and the fourth planetary gear mechanism PGSd are set to a locked state in which the elements cannot rotate relative to each other, and the rotation speeds of all of the elements of the third planetary gear mechanism PGSc and the fourth planetary gear mechanism PGSd become "1". Then, the rotation speeds of the first carrier Ca and the second carrier Cb become $h/(h+1)$, the rotation speed of the second ring gear Rb to which the output gear 29 is connected becomes "4th" shown in FIG. 4, and the fourth gear is established.

When the fifth gear is established, the first brake B1 is engaged, the second brake B2 is set to the reverse rotation preventing state, the first clutch C1 is engaged, and the third clutch C3 is engaged. Setting the second brake B2 to the reverse rotation preventing state allows the forward rotation of the first carrier Ca and the second carrier Cb. Engaging the first brake B1 causes the rotation speed of the first sun gear Sa to become "0". Engaging the first clutch C1 causes the rotation speeds of the first carrier Ca and the second carrier Cb to become "1" which is the same speed as the rotation speed of the third sun gear Sc. As a result, the rotation speed of the second ring gear Rb to which the output gear 29 is connected becomes "5th" shown in FIG. 4 and the fifth gear is established.

Note that there is no need to engage the third clutch C3 to establish the fifth gear. However, since the third clutch C3 needs to be engaged in the fourth gear and the sixth gear which are adjacent to the fifth gear, engaging the third clutch C3 while the fifth gear is established allows smooth shifting to the fourth gear or the sixth gear.

When the sixth gear is established, the second brake B2 is set to the reverse rotation preventing state, the first clutch C1 is engaged, the second clutch C2 is engaged, and the third clutch C3 is engaged. Setting the second brake B2 to the reverse rotation preventing state allows the forward rotation of the first carrier Ca and the second carrier Cb. As described in the fourth gear, engaging the second clutch C2 and the third clutch C3 causes the third planetary gear mechanism PGSc and the fourth planetary gear mechanism PGSd to be set to a locked state and causes the rotation speeds of the third ring gear Rc and the second sun gear Sb to become "1". Engaging the first clutch C1 causes the rotation speeds of the first carrier Ca and the second carrier Cb to become "1".

In the second planetary gear mechanism PGSb, the rotation speeds of the second carrier Cb and the second sun gear Sb thereby become the same speed of "1" and the elements are set to the locked state in which the elements cannot rotate relative to each other. As a result, the rotation speed of the second ring gear Rb to which the output gear 29 is connected becomes "1" of "6th" shown in FIG. 4 and the sixth gear is established.

When the seventh gear is established, the second brake B2 is set to the reverse rotation preventing state, the third brake B3 is engaged, the first clutch C1 is engaged, and the third clutch C3 is engaged. Setting the second brake B2 to the reverse rotation preventing state allows the forward rotation of the first carrier Ca and the second carrier Cb. Engaging the third brake B3 causes the rotation speed of the fourth sun gear Sd to become "0". Engaging the third clutch C3 causes the rotation speed of the fourth ring gear Rd to become "1" which is the same speed as the rotation speed of the third sun gear Sc, and causes the rotation speeds of the third carrier Cc, the first ring gear Ra, and the fourth carrier Cd to become $k/(k+1)$. Engaging the first clutch C1 causes the rotation speeds of the first carrier Ca and the second carrier Cb to become "1" which is the same speed as the rotation speed of the third sun gear Sc connected to the input shaft 12. As a result, the rotation speed of the second ring gear Rb to which the output gear 29 is connected becomes "7th" shown in FIG. 4 and the seventh gear is established.

When the eighth gear is established, the second brake B2 is set to the reverse rotation preventing state, the third brake B3 is engaged, the first clutch C1 is engaged, and the second clutch C2 is engaged. Setting the second brake B2 to the reverse rotation preventing state allows the forward rotation of the first carrier Ca and the second carrier Cb. Engaging the third brake B3 causes the rotation speed of the fourth sun gear Sd to become "0". Engaging the second clutch C2 causes the rotation speeds of third ring gear Rc and the second sun gear Sb to become "0" which is the same speed as the rotation speed of the fourth sun gear Sd. Engaging the first clutch C1 causes the rotation speeds of the first carrier Ca and the second carrier Cb to become "1" which is the same speed as the rotation speed of the third sun gear Sc. As a result, the rotation speed of the second ring gear Rb to which the output gear 29 is connected becomes "8th" shown in FIG. 4 and the eighth gear is established.

When the ninth gear is established, the second brake B2 is set to the reverse rotation preventing state, the third brake B3 is engaged, the fourth brake B4 is engaged, and the first clutch C1 is engaged. Setting the second brake B2 to the reverse rotation preventing state allows the forward rotation of the first carrier Ca and the second carrier Cb. Engaging the third brake B3 causes the rotation speed of the fourth sun gear Sd to become "0". Engaging the fourth brake B4 also causes the rotation speed of the fourth ring gear Rd to become "0". This sets the fourth planetary gear mechanism PGSd to the locked state and causes the rotation speeds of the fourth carrier Cd, the third carrier Cc and the first ring gear Ra to become "0".

Engaging the first clutch C1 causes the rotation speeds of the first carrier Ca and the second carrier Cb to become "1" which is the same speed as the rotation speed of the third sun gear Sc. As a result, the rotation speed of the second ring gear Rb to which the output gear 29 is connected becomes "9th" shown in FIG. 4 and the ninth gear is established.

When the tenth gear is established, the second brake B2 is set to the reverse rotation preventing state, the fourth brake B4 is engaged, the first clutch C1 is engaged, and the second clutch C2 is engaged. Setting the second brake B2 to the reverse rotation preventing state allows the forward rotation of the first carrier Ca and the second carrier Cb. Engaging the second clutch C2 causes the third ring gear Rc and the second sun gear Sb to rotate at the same speed as the fourth sun gear Sd. Engaging the fourth brake B4 causes the rotation speed of the fourth ring gear Rd to become "0". Engaging the first clutch C1 causes the rotation speeds of the first carrier Ca and the second carrier Cb to become "1" which is the same speed as the rotation speed of the third sun gear Sc. As a result, the rotation speed of the second ring gear Rb to which the output gear 29 is connected becomes "10th" shown in FIG. 4 and the tenth gear is established.

When the reverse gear is established, the second brake B2 is set to the forward rotation preventing state, the third brake B3 is engaged, and the third clutch C3 is engaged. Engaging the third brake B3 and the third clutch C3 causes the rotation speeds of the third carrier Cc, the first ring gear Ra, and the fourth carrier Cd to become $k/(k+1)$. Setting the second brake B2 to the forward rotation preventing state prevents the forward rotation of the first carrier Ca and the second carrier Cb and causes the rotation speeds of the first carrier Ca and the second carrier Cb to become "0". As a result, the rotation speed of the second ring gear Rb to which the output gear 29 is connected becomes "Rvs" shown in FIG. 4 and the reverse gear is established.

Next, description is given of reduction of friction in the thrust bearings.

Figure 11:
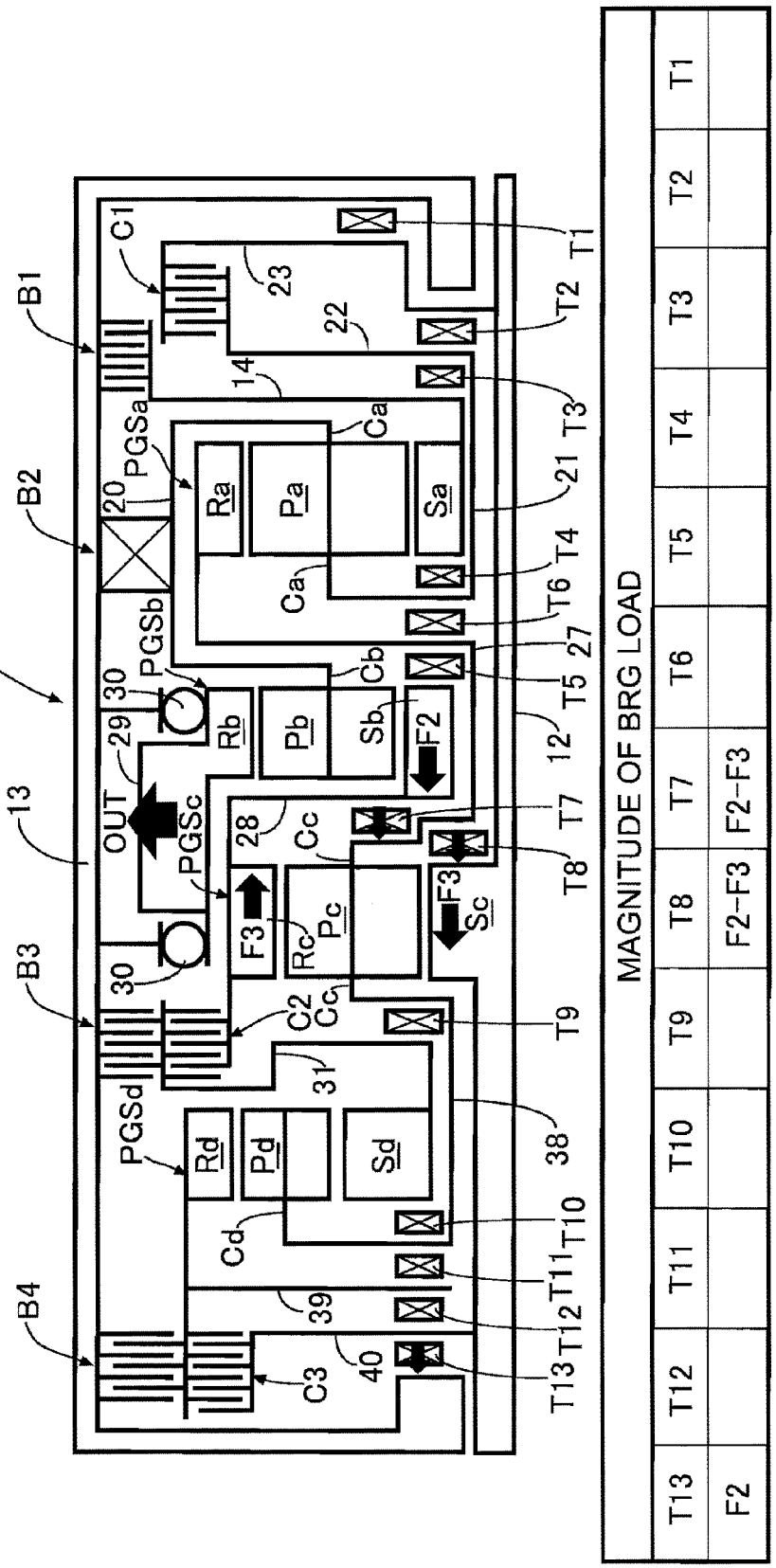
FIG. 11 is a view showing transmission routes of thrust loads F2, F3.

The thrust load F2 acting leftward in the drawing acts on the second sun gear Sb of the second planetary gear mechanism PGSb in all forward gears (see FIGS. 7 and 11). The thrust load F2 is transmitted from the second sun gear Sb to the input shaft via the seventh thrust bearing T7, the third carrier Cc of the third planetary gear mechanism PGSc, the eighth thrust bearing T8, and the third sun gear Sc of the third planetary gear mechanism PGSc. Then, the thrust load F2 is transmitted from the input shaft 12 to the transmission case 13 via the clutch hub 40 of the third clutch C3, and the thirteenth thrust bearing T13.

In this case, as shown in FIG. 3, the distance L1 from the load transmission surface P1, where thrust load is transmitted from the second sun gear Sb of the second planetary gear mechanism PGSb to the seventh thrust bearing T7, to the load receiving surface P2, where the thrust plate 49 receives the thrust load from the twelfth thrust bearing T12, is set to be greater than the sum of the axial lengths of the seventh thrust bearing T7, the third carrier Cc of the third planetary gear mechanism PGSc, the ninth thrust bearing T9, the clutch drum 31 of the second clutch C2, the shim 50, the fourth sun gear Sd of the fourth planetary gear mechanism PGSd, the tenth thrust bearing T10, the fourth carrier Cd of the fourth planetary gear mechanism PGSd, the eleventh thrust bearing T11, the clutch drum 39 of the third clutch C3, and the twelfth thrust bearing T12 which are disposed between the load transmission surface P1 and the load receiving surface P2. Accordingly, the thrust load F2 of the second sun gear Sb of the second planetary gear mechanism PGSb is transmitted to the transmission case 13 via the input shaft 12 through the shortest route. As a result, the thrust load F2 is prevented from being transmitted through many parts such as the fourth planetary gear mechanism PGSd, the thrust bearings T9 to T12 or the like and reduction of friction and reduction of thickness of each part is thus made possible.

Moreover, in the third gear and the fourth gear, the thrust load F4 (see FIGS. 7 and 15) acting leftward in the drawing acts on the fourth ring gear Rd of the fourth planetary gear mechanism PGSd. The thrust load F4 can be transmitted from the fourth ring gear Rd to the input shaft 12 via the clutch drum 39, the twelfth thrust bearing T12, and the thrust plate 49, and then supported by the transmission case 13 via the thirteenth thrust bearing T13 from the input shaft 12.

FIG. 6 shows a procedure of determining thickness of the shim 50 (see FIG. 3). First, the third clutch C3, the fourth brake B4, the third brake B3, the fourth planetary gear mechanism PGSd, or the like are assembled to the outer periphery of the input shaft 12. In this state, a distance X from a surface to come in contact with the shim 50, of the fourth sun gear Sd of the fourth planetary gear mechanism PGSd to a right end, in the drawing, of the third sun gear Sc of the third planetary gear mechanism PGSc spline-coupled to the input shaft 12 in advance is measured.

Next, a distance Y from a left end (a surface to come in contact with the shim 50) to a right end (a surface to come in contact with the ninth thrust bearing T9), in the drawing, of the clutch drum 31 of the second clutch C2 assembled in advance as a sub-assembly is measured. Moreover, the third carrier Cc, the third pinions Pc, the eighth thrust bearing T8, and the ninth thrust bearing T9 are assembled to each other as a sub-assembly in advance and a distance Z from a left end of the ninth thrust bearing T9 in the drawing to a left end of the eighth thrust bearing T8 in the drawing is measured. Then, the thickness of the shim 50 is determined to be a value slightly smaller than $X-(Y+Z)$. The shim 50 corresponding to the determined thickness can be selected from multiple types of shims 50 different in thickness which are prepared in advance, so as to be used.

When the sub-assembly of the third carrier Cc assembled in advance is assembled in such a way as to be fitted to the outer periphery of the input shaft 12 as described above, the inner periphery spline SPi of the third carrier Cc passes an outer periphery of the third sun gear Sc from right to left in the drawing. In this case, since the radius r1 of the inner periphery spline SPi of the third carrier Cc is set to be larger than the radius r2 of the third sun gear Sc, the sub-assembly of the third planetary gear mechanism PGSc can be assembled without interfering with the third sun gear Sc.

Since the shim 50 is disposed between the fourth sun gear Sd of the fourth planetary gear mechanism PGSd and the clutch drum 31 of the second clutch C2 which can couple the third ring gear Rc of the third planetary gear mechanism PGSc and the fourth sun gear Sd of the fourth planetary gear mechanism PGSd to each other as described above, the insertion of the shim 50 does not affect relative distances among the elements of the fourth planetary gear mechanism PGSd or distances among elements of the second clutch C2. In addition, since the shim 50 can be disposed by using a dead space between the fourth planetary gear mechanism PGSd and the second clutch C2, the increase of an axial dimension of the automatic transmission T can be suppressed to a minimum.

As shown in FIG. 2, an end portion, on a left side in the drawing, of the first carrier Ca of the first planetary gear mechanism PGSa and an end portion, on a left side in the drawing, of the connection member 21 extending from the clutch hub 22 of the first clutch C1 abut on each other in the abutting portion 51. Accordingly, the thrust load acting rightward in the drawing on the second sun gear Sb of the second planetary gear mechanism PGSb during deceleration traveling of a vehicle (during engine brake operation) or during reverse traveling of the vehicle is transmitted to the stator shaft 19 (transmission case 13) in a route from the fifth thrust bearing T5 to the connection member 27, to the sixth thrust bearing T6, to the first carrier Ca of the first planetary gear mechanism PGSa, to the abutting portion 51, to the connection member 21, to the clutch hub 22 of the first clutch C1, to the second thrust bearing T2, to the clutch drum 23 of the first clutch C1, to the shim 52, and then to the first thrust bearing T1.

Here, assume that there is no abutting portion 51. In this case, the load inputted from the sixth thrust bearing T6 to the first carrier Ca of the first planetary gear mechanism PGSa is transmitted from the clutch hub 22 of the first clutch C1 to the second thrust bearing T2 in a route from the fourth thrust bearing T4 to the first sun gear Sa of the first planetary gear mechanism PGSa, and to the third thrust bearing T3, without passing through the connection member 21. Hence, large friction is generated in the fourth thrust bearing T4 and the third thrust bearing T3 which are disposed on opposite sides of the first sun gear Sa, which rotates at a high speed, of the first planetary gear mechanism PGSa. Moreover, the configuration in which the thrust load is transmitted through the fourth thrust bearing T4 and the third thrust bearing T3 has a problem that the number of types of thickness of the shim 52 needs to be increased to compensate dimensional tolerances of the fourth thrust bearing T4 and the third thrust bearing T3.

Meanwhile, in the embodiment, the abutting portion 51 is provided and the thrust load thereby bypasses the fourth thrust bearing T4 and the third thrust bearing T3 between which the first sun gear Sa of the first planetary gear mechanism PGSa is interposed. Accordingly, it is possible not only to reduce the friction in the fourth thrust bearing T4 and the third thrust bearing T3 but also to reduce the number of types of thickness of the shim 52 because there is no need to consider the dimensional tolerances of the fourth thrust bearing T4 and the third thrust bearing T3.

At this time, the distance L2 from the load transmission surface P3, where the thrust load is transmitted from the first carrier Ca of the first planetary gear mechanism PGSa to the fourth thrust bearing T4, to the load receiving surface P4, where the clutch hub 22 of the first clutch C1 receives the thrust load from the third thrust bearing T3, is set to be greater than the sum of the axial lengths of the fourth thrust bearing T4, the first sun gear Sa of the first planetary gear mechanism PGSa, and the third thrust bearing T3. Accordingly, it is possible to avoid a case where the thrust load inputted from the second planetary gear mechanism PGSb and acting rightward in the drawing is transmitted to the transmission case 13 through the fourth thrust bearing T4 and the third thrust bearing T3, and to surely reduce the friction.

Note that the end portion of the first carrier Ca of the first planetary gear mechanism PGSa in which the abutting portion 51 is provided also serves as a holding portion of the sixth thrust bearing T6.

Next, description is given of setting directions of the torsion angles of the helical gears in the first planetary gear mechanism PGSa, the second planetary gear mechanism PGSb, the third planetary gear mechanism PGSc, and the fourth planetary gear mechanism PGSd.

Since the second ring gear Rb of the second planetary gear mechanism PGSb is formed integrally with the output gear 29, the thrust load F2 generated by the second ring gear Rb and acting rightward in the drawing is transmitted to the transmission case 13 through the output gear 29 and the ball bearings 30. Accordingly, the thrust load F2 generated by the second sun gear Sb of the second planetary gear mechanism PGSb and acting leftward in the drawing cannot be directly canceled out by the thrust load F2 generated by the second ring gear Rb of the second planetary gear mechanism PGSb and acting rightward in the drawing, and needs to be supported by being transmitted to the transmission case 13 through some route. At this time, if the thrust load F2 of the second sun gear Sb acting leftward in the drawing can be canceled out by a thrust load generated by another planetary gear mechanism, friction of a thrust bearing existing in a route through which the thrust load F2 is transmitted to the transmission case 13 can be reduced.

In view of this, in the embodiment, as shown in FIG. 11, the thrust load F2, acting leftward in the drawing, generated by the second sun gear Sb of the second planetary gear mechanism PGSb is immediately canceled out in the connection member 28 by the thrust load F3, acting rightward in the drawing, generated by the third ring gear Rc of the third planetary gear mechanism PGSc adjacent to the second sun gear Sb, and only a thrust load F2-F3 which is a difference between these thrust loads is transmitted to the transmission case 13 via the eighth thrust bearing T8, the third sun gear Sc of the third planetary gear mechanism PGSc, the input shaft 12, and the thirteenth thrust bearing T13.

As is apparent from FIG. 10, in the embodiment, the thrust load F2 of the second sun gear Sb acting leftward in the drawing is larger than the thrust load F3 of the third ring gear Rc acting rightward in the drawing in all of the forward gears, and the thrust load F2-F3 which is a difference between these thrust loads always acts leftward in the drawing. However, there is no need to always establish the aforementioned relationship of F2>F3 and the torsion angles of the gears can be set in such a way that the relationship of F2<F3 is established in low gears (for example, the first gear and the second gear). This is because loss of power transmission is inherently large in the low gears used in start and low-speed travelling and an obtained friction reduction effect is small even when the relationship of F2>F3 is established.

Moreover, although the thrust load F2 of the second sun gear Sb acting leftward in the drawing is inputted to the seventh thrust bearing T7 and the eighth thrust bearing T8, loads acting on the seventh thrust bearing T7 and the eighth thrust bearing T8 can be reduced by cancelling out part of the thrust load F2 by the thrust load F3 of the third ring gear Rc acting rightward in the drawing.

Note that, in FIG. 11, it is assumed that no load acts on the first planetary gear mechanism PGSa and the fourth planetary gear mechanism PGSd.

Figure 12:
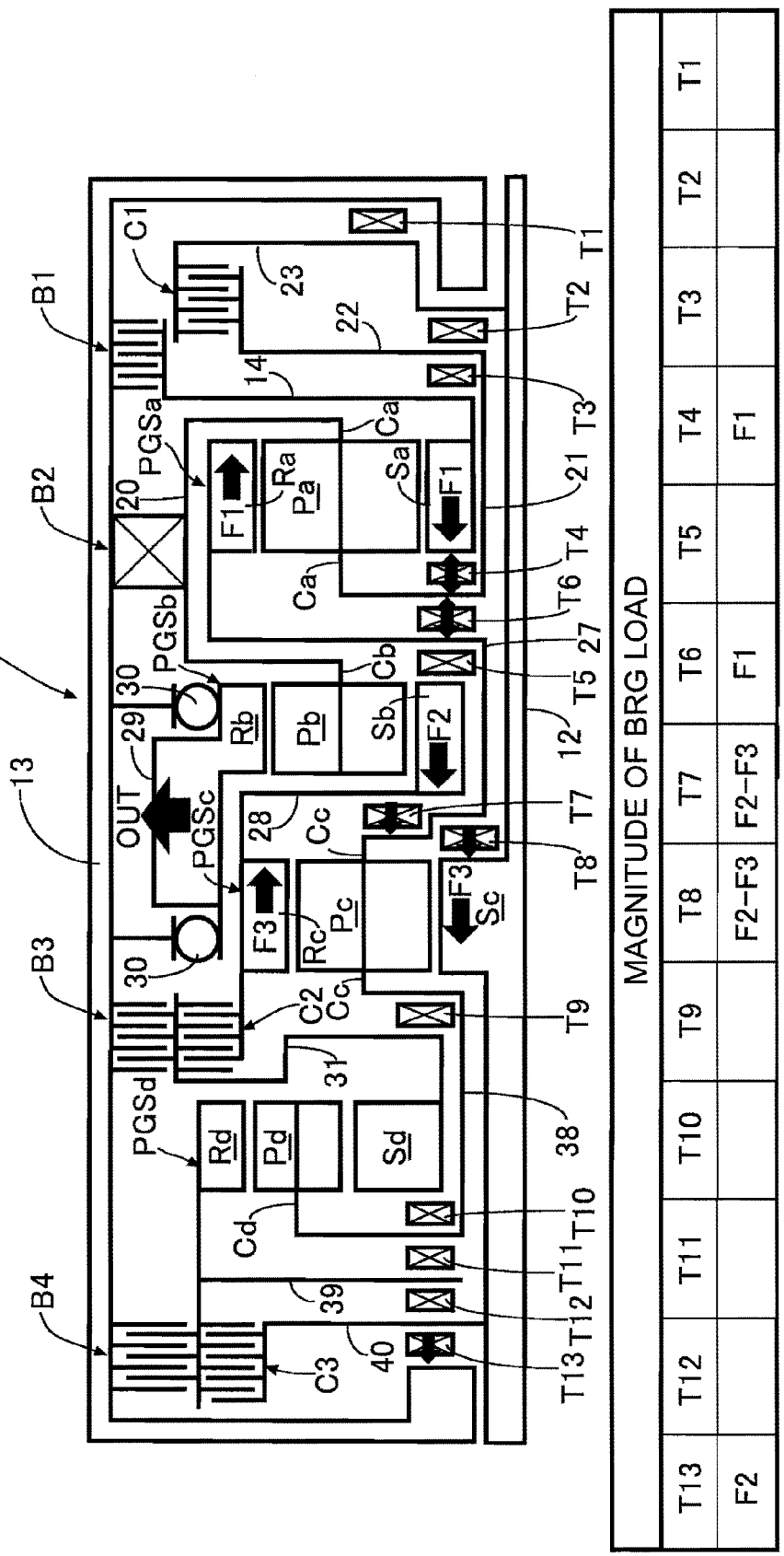
FIG. 12 is a view showing transmission routes of thrust loads F1, F2, F3.

As shown in FIGS. 7 and 12, the thrust loads F1 act on the first sun gear Sa and the first ring gear Ra of the first planetary gear mechanism PGSa only in the first to fifth gears. Moreover, the thrust load F1 of the first sun gear Sa acting leftward in the drawing and the thrust load F1 of the first ring gear Ra acting rightward in the drawing are equal to each other. Then, the thrust load F1 of the first sun gear Sa acting leftward in the drawing is transmitted to the first ring gear Ra through a route from the fourth thrust bearing T4 to the first carrier Ca, to the sixth thrust bearing T6, and to the connection member 27 and is completely canceled out by the thrust load F1 of the first ring gear Ra acting rightward in the drawing. Accordingly, the thrust loads F1 do not affect the other planetary gear mechanisms.

The direction of the thrust load acting on the sun gear of each planetary gear mechanism is determined by the rotating direction (direction of torque) of the sun gear and the direction of the torsion angle on a tooth surface. Since the direction of the torsion angle does not change, the direction of the thrust load changes according to the change in the rotating direction. Moreover, in the single-pinion planetary gear mechanism, the thrust load acting on the sun gear and the thrust load acting on the ring gear act in directions opposite to each other.

In the embodiment, since the rotating direction (direction of torque) of the fourth sun gear Sd of the fourth planetary gear mechanism PGSd is as shown in FIG. 7, the thrust loads F4 of the fourth sun gear Sd and the fourth ring gear Rd of the fourth planetary gear mechanism PGSd act rightward and leftward, respectively, in the drawing in the third gear, the fourth gear, and the reverse gear but changes to act leftward and rightward, respectively, in the drawing in the sixth gear, the seventh gear, the ninth gear, and the tenth gear. The following operations and effects can be obtained by setting the directions of the thrust loads F4 of the fourth sun gear Sd and the fourth ring gear Rd as described above.

Figure 13:
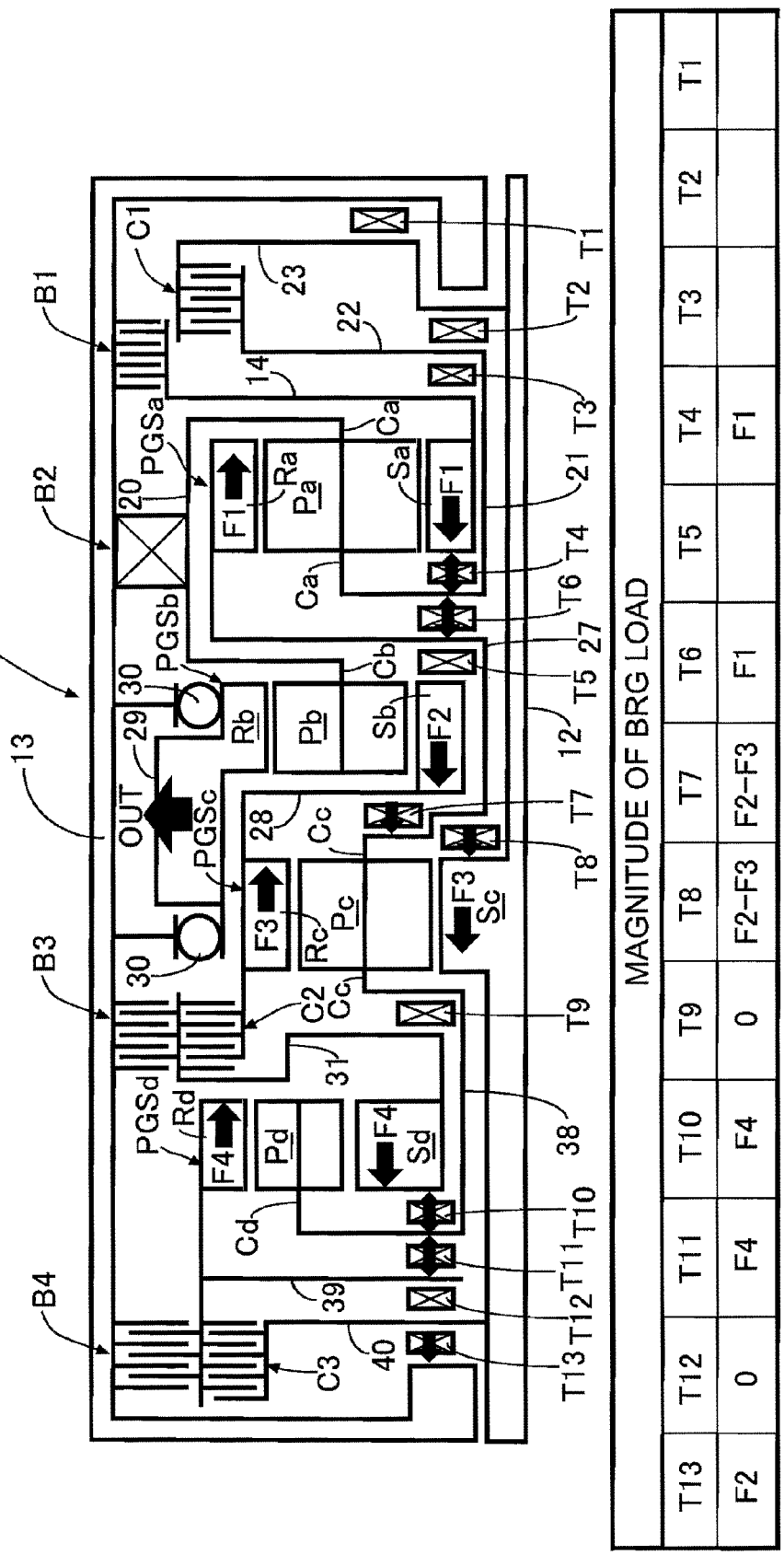
FIG. 13 is a view showing transmission routes of thrust loads F1, F2, F3, F4 in sixth, seventh, ninth, and tenth gears.

As shown in FIG. 8, the ninth gear and the tenth gear which are high gears have a problem that the differential rotation of the twelfth thrust bearing T12 reaches 1000 rpm which is the maximum and the friction increases. However, setting the directions of the thrust loads F4 of the fourth sun gear Sd and the fourth ring gear Rd as described above causes the thrust loads F4 of the fourth sun gear Sd and the fourth ring gear Rd to be canceled out in the tenth thrust bearing T10 and the eleventh thrust bearing T11 in the ninth gear and the tenth gear as shown in FIG. 13. Hence, no thrust loads are transmitted to the twelfth thrust bearing T12 where the differential rotation is large, and the friction of the twelfth thrust bearing T12 can be effectively reduced.

Figure 14:
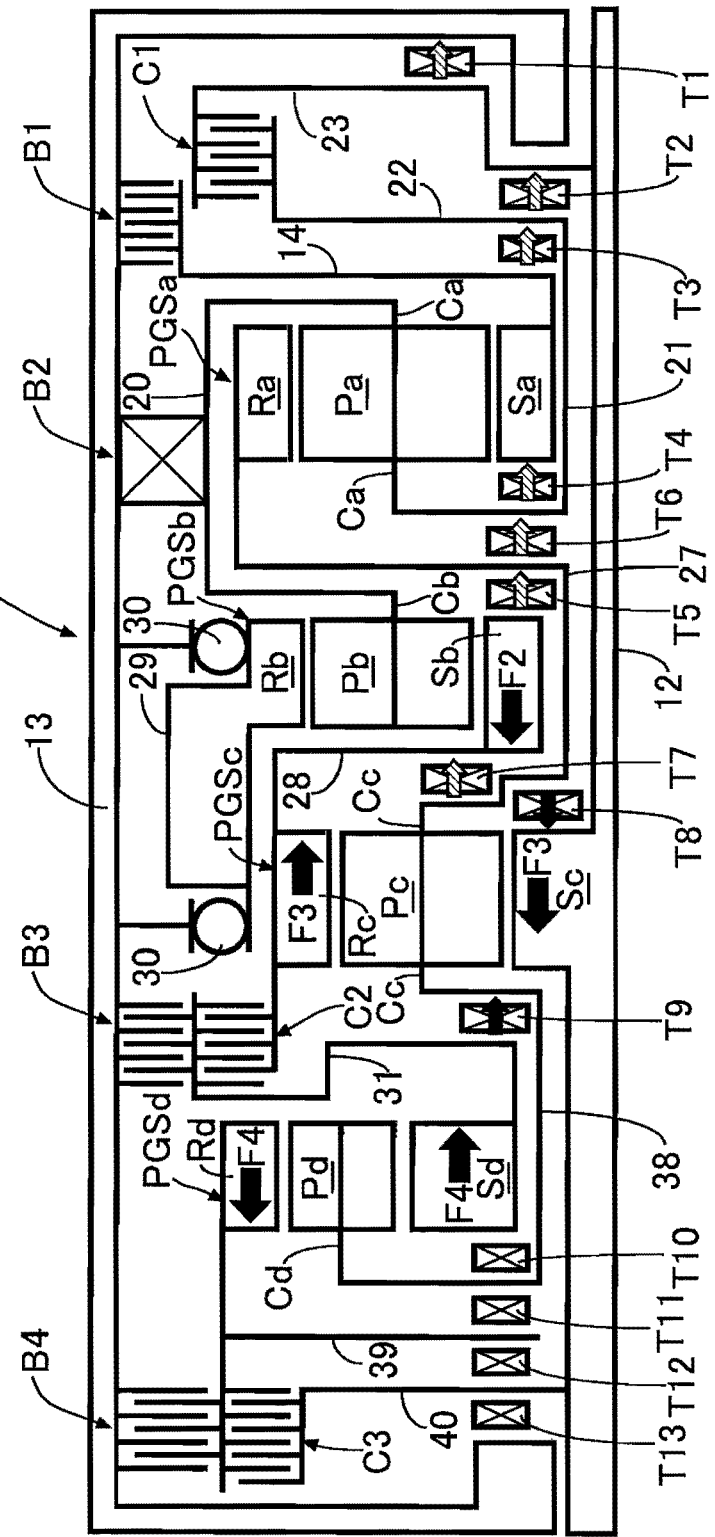
FIG. 14 is a view showing a comparative example corresponding to FIG. 13.
Figure 15:
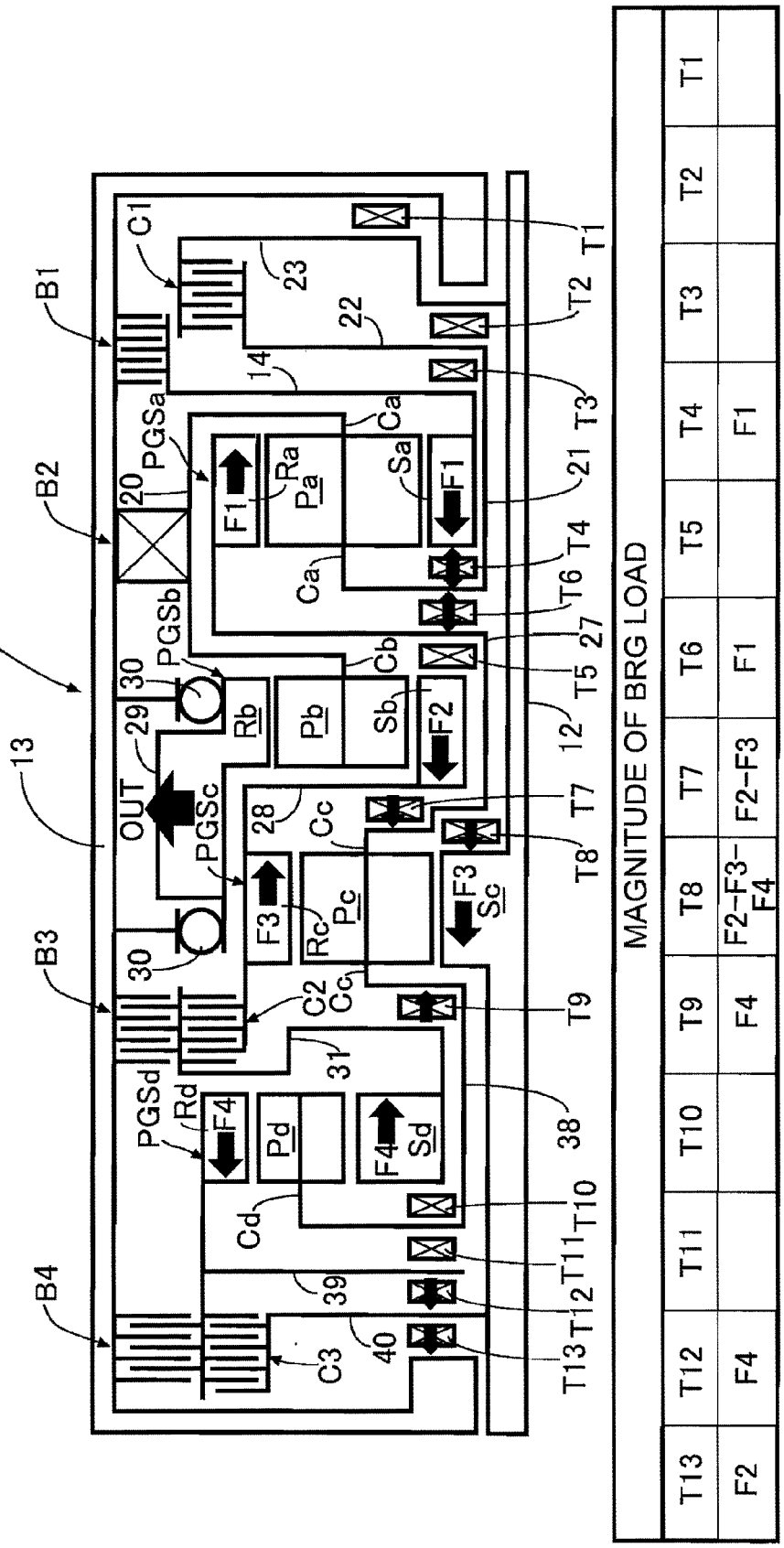
FIG. 15 is a view showing transmission routes of thrust loads F1, F2, F3, F4 in third and fourth gears.

Incidentally, in the sixth gear, the thrust load F4 acting rightward in the drawing on the fourth sun gear Sd of the fourth planetary gear mechanism PGSd becomes large (see FIG. 10). Here, assume that the directions of the thrust loads F4 acting on the fourth ring gear Rd and the fourth sun gear Sd of the fourth planetary gear mechanism PGSd are set to be reversed from those in the embodiment which are described in FIG. 13. In this case, as shown in FIG. 14, the thrust load F2-F3 acting leftward in the drawing and the thrust load F4 acting rightward in the drawing and transmitted from the fourth sun gear Sd via the ninth thrust bearing T9 are inputted to the seventh thrust bearing T7. Since the thrust load F4 acting rightward in the drawing becomes large in the sixth gear, F2-F3-F4 which is a combined force of the thrust load F2-F3 and the thrust load F4 takes a negative value and may bias the seventh thrust bearing T7 rightward in the drawing.

In such a situation, the thrust load biasing the seventh thrust bearing T7 rightward in the drawing is transmitted to the stator shaft 19 (transmission case 13) through a route from the seventh thrust bearing T7 to the fifth thrust bearing T5, to the sixth thrust bearing T6, to the second thrust bearing T2, and to the first thrust bearing T1, and friction of each of the five thrust bearings T7 to T5, T2, T1 existing in the route increases.

In view of this, the torsion angles of the helical gears need to be set in such a way that the thrust load F4 of the fourth sun gear Sd of the fourth planetary gear mechanism PGSd acts leftward in the drawing in the sixth gear, the seventh gear, the ninth gear, and the tenth gear.

Incidentally, as described above, when the torsion angles of the helical gears are set in such a way that the thrust load F4 of the fourth sun gear Sd of the fourth planetary gear mechanism PGSd acts leftward in the drawing in the sixth gear, the seventh gear, the ninth gear, and the tenth gear, the direction of the thrust load F4 of the fourth sun gear Sd of the fourth planetary gear mechanism PGSd is reversed in the third gear and the fourth gear and acts rightward in the drawing (see FIG. 7). Accordingly, as described in FIG. 14, the thrust load F4 of the fourth sun gear Sd may be transmitted to the five thrust bearings T7 to T5, T2, T1.

However, since the thrust load F4 of the fourth sun gear Sd acting rightward in the drawing in the third gear and the fourth gear is small compared to the thrust load F4 of the fourth sun gear Sd acting rightward in the drawing in the sixth gear (see FIG. 10), F2-F3-F4 which is the combined force of the thrust load F2-F3 and the thrust load F4 does not take a negative value. Accordingly, it is possible to avoid a situation where the thrust load F4 is transmitted to the stator shaft 19 (transmission case 13) via the five thrust bearings T7 to T5, T2, T1 (see FIG. 15).

Moreover, the thrust load F4 of the fourth ring gear Rd of the fourth planetary gear mechanism PGSd acting leftward in the drawing is transmitted to the twelfth thrust bearing T12 in the third gear and the fourth gear. However, since the differential rotation of the twelfth thrust bearing T12 is zero in the third gear and the fourth gear (see FIG. 8), the problem of increase in friction of the twelfth thrust bearing T12 does not occur even when the thrust load F4 is inputted.

The embodiment of the present invention has been described above. However, various design changes can be made in the present invention within a scope not departing from the gist of the invention.

For example, although the third sun gear Sc of the third planetary gear mechanism PGSc is spline-coupled to the input shaft 12 in the embodiment, the third sun gear Sc may be formed integrally with the input shaft 12.

Moreover, although the second brake B2 is formed of the two-way clutch in the embodiment, the second brake B2 can be formed of a multi-plate brake.

Furthermore, although the shim 52 is disposed between the first thrust bearing T1 and the clutch drum 23 of the first clutch C1 in the embodiment, the shim 52 may be disposed between the first thrust bearing T1 and the stator shaft 19 (transmission case 13).

What is claimed is:
1. An automatic transmission, comprising:
a plurality of planetary gear mechanisms disposed on an axis of an input shaft housed in a transmission case, the plurality of planetary gear mechanisms including:
a planetary gear mechanism A in which elements are rotatable relative to each other; and a planetary gear mechanism B disposed adjacent to the planetary gear mechanism A, in which elements are rotatable relative to each other;

a clutch disposed between the planetary gear mechanism B and the transmission case and capable of coupling a carrier of the planetary gear mechanism B to the input shaft;

a connection member disposed inside a sun gear of the planetary gear mechanism B in a radial direction and connecting the carrier of the planetary gear mechanism B to a clutch hub of the clutch;

an abutting portion in which an end portion of the connection member, on the planetary gear mechanism A side, axially abuts on the carrier of the planetary gear mechanism B;

a bearing A disposed between the connection member and a clutch drum of the clutch and capable of supporting a thrust load; and a bearing B disposed between the transmission case and the clutch drum of the clutch and capable of supporting the thrust load, wherein a predetermined gear is established by controlling a coupling relationship among elements of the plurality of planetary gear mechanisms, the input shaft, and the transmission case by using a plurality of the clutches and a plurality of brakes.

2. The automatic transmission according to claim 1, wherein a shim, configured to adjust variations in dimensions of parts disposed on the input shaft, is disposed on a side of the clutch drum of the clutch which is opposite to the planetary gear mechanism B.

3. The automatic transmission according to claim 1 or 2, further comprising:

a bearing C disposed between the sun gear and the carrier of the planetary gear mechanism B and capable of supporting the thrust load; and a bearing D disposed between the clutch hub of the clutch and the sun gear of the planetary gear mechanism B and capable of supporting the thrust load, wherein a distance from a load transmission surface, where the thrust load is transmitted from the carrier of the planetary gear mechanism B to the bearing C, to a load receiving surface, where the clutch hub of the clutch receives the thrust load from the bearing D, is set to be greater than a sum of axial lengths of the bearing C, the sun gear of the planetary gear mechanism B, and the bearing D.

\* \* \* \* \*